United States Patent
Campbell et al.

(10) Patent No.: US 9,259,790 B2
(45) Date of Patent: Feb. 16, 2016

(54) POWER TOOL WITH AUTOMATIC CHUCK

(75) Inventors: David C. Campbell, Bel Air, MD (US); Steven J. Phillips, Ellicott City, MD (US); Derek E. T. Muir, Daisy Hill (GB); Fugen Qin, Lutherville Timonium, MD (US)

(73) Assignee: BLACK & DECKER INC., New Britain, CT (US)

( * ) Notice: Subject to any disclaimer, the term of this patent is extended or adjusted under 35 U.S.C. 154(b) by 247 days.

(21) Appl. No.: 13/453,251

(22) Filed: Apr. 23, 2012

(65) Prior Publication Data

US 2013/0277923 A1 Oct. 24, 2013

(51) Int. Cl.
B23B 31/10 (2006.01)
B23B 31/12 (2006.01)

(52) U.S. Cl.
CPC .......... *B23B 31/123* (2013.01); *B23B 2231/06* (2013.01); *B23B 2231/38* (2013.01); *B23B 2260/128* (2013.01); *Y10S 279/901* (2013.01); *Y10T 279/21* (2015.01); *Y10T 279/3431* (2015.01); *Y10T 279/3451* (2015.01)

(58) Field of Classification Search
CPC ............ B23B 2260/128; B23B 31/123; B23B 2231/38
USPC ......... 279/125, 126, 148, 150, 147, 149, 157, 279/901, 134, 135, 128, 140, 62; 388/937
See application file for complete search history.

(56) References Cited

U.S. PATENT DOCUMENTS

| | | | |
|---|---|---|---|
| 2,716,555 A * | 8/1955 | Rowe | 279/56 |
| 4,317,578 A * | 3/1982 | Welch | 279/60 |
| 4,410,846 A * | 10/1983 | Gerber et al. | 318/490 |
| 4,526,497 A | 7/1985 | Hatfield | |
| 4,915,555 A * | 4/1990 | Smothers | 408/240 |
| 5,253,879 A | 10/1993 | Huff et al. | |
| 5,988,957 A | 11/1999 | Wheeler | |
| 6,241,260 B1 | 6/2001 | Judge et al. | |
| 6,431,289 B1 | 8/2002 | Potter et al. | |
| 6,634,439 B2 | 10/2003 | Driessen | |
| 6,675,911 B2 | 1/2004 | Driessen | |
| 7,021,399 B2 | 4/2006 | Driessen | |
| 7,021,400 B2 | 4/2006 | Oretti | |
| 7,328,904 B2 | 2/2008 | Schell et al. | |
| 7,331,584 B2 | 2/2008 | Zhang et al. | |
| 7,360,770 B2 | 4/2008 | Luckenbaugh et al. | |

(Continued)

OTHER PUBLICATIONS

Liu et al. "Electrical Machines" in "The Electrical Engineering Handbook" Ed. by R. Dorf, Boca Raton: CRC Press LLC, 2000.*

*Primary Examiner* — Eric A Gates
*Assistant Examiner* — Chwen-Wei Su
(74) *Attorney, Agent, or Firm* — Stephen R. Valancius

(57) ABSTRACT

A power tool having a tool portion, a chuck and a lock. The tool portion has a housing, a motor, and a spindle driven by the motor. The chuck has a body coupled to the spindle for rotation therewith, and a sleeve rotatably disposed about the body. The lock has a first lock structure pivotally coupled to the housing about a pivot axis, and a second lock structure. The first lock structure has a first locking feature. The second lock structure has a second locking feature and is coupled to the sleeve for rotation therewith. Pivoting the first lock structure into a first pivot position positions the first locking feature in a rotational path of the second locking feature. Engagement of the first and second locking features inhibits rotation of the sleeve so that rotation of the spindle will cause corresponding rotation of the body relative to the sleeve.

16 Claims, 8 Drawing Sheets

(56) References Cited

U.S. PATENT DOCUMENTS

| | | |
|---|---|---|
| 7,491,020 B2 | 2/2009 | Gehret et al. |
| 7,503,734 B2 | 3/2009 | Puzio |
| 7,520,512 B2 | 4/2009 | Campbell et al. |
| 7,537,421 B2 | 5/2009 | Puzio et al. |
| 7,658,574 B2 | 2/2010 | Gehret et al. |
| 7,753,381 B2 | 7/2010 | Nickels, Jr. et al. |
| 7,757,374 B2 | 7/2010 | Luckenbaugh et al. |
| 7,942,211 B2 | 5/2011 | Scrimshaw et al. |
| 8,038,156 B2 | 10/2011 | Nickels, Jr. et al. |
| 8,505,649 B2 | 8/2013 | Scrimshaw et al. |
| 2006/0175768 A1 | 8/2006 | Campbell et al. |
| 2006/0185870 A1 | 8/2006 | Gehret et al. |
| 2009/0200053 A1* | 8/2009 | Scrimshaw et al. ............. 173/47 |
| 2010/0163261 A1 | 7/2010 | Tomayko et al. |
| 2012/0074656 A1 | 3/2012 | Campbell et al. |

* cited by examiner

POWER TOOL WITH AUTOMATIC CHUCK

FIELD

The present disclosure relates to a power tool with an automatic chuck.

BACKGROUND

This section provides background information related to the present disclosure which is not necessarily prior art.

Chucks for holding a drill bit or a screwdriver bit have been known for many years. Chucks often times comprise an inner cylindrical hollow core to which a plurality of jaws are held at an angle. The jaws may move into and out of the hollow core thereby clamping a bit there within. In order to advance or retract the jaws, the jaws have a threaded portion that cooperates with a threaded collet member that is generally held circumferentially around the jaws in a rotatable, but axially immovable manner. Thus, on rotation of the collet member, the threads cooperate to advance or retract the jaws.

Whilst the above mode of advancing or retracting the jaws is generally acceptable, it does suffer from some short-coming. In order for the chuck to accommodate bits of significantly different diameters, the amount by which the collet member must be rotated to advance or retract the jaws can be considerable. In situations where a user must frequently change between larger and smaller diameter bits, the operation of a chuck in the usual manner can be very inconvenient. Moreover, because conventional chucks are hand-tightened, the amount of force that secures a bit within a chuck is dependent upon the strength of the person using the tool.

SUMMARY

This section provides a general summary of the disclosure, and is not a comprehensive disclosure of its full scope or all of its features.

In one form, the present teachings provide a power tool that includes a tool portion, a chuck and a locking mechanism. The tool portion has a housing, a motor disposed in the housing, and an output spindle driven by the motor. The chuck has a chuck body, which is coupled to the output spindle for rotation therewith, and a sleeve that is disposed about and rotatable relative to the chuck body. The locking mechanism has a first lock structure and a second lock structure. The first lock structure is pivotally coupled to the housing about a pivot axis and has a first locking feature. The second lock structure has a second locking feature and is coupled to the sleeve for rotation therewith. The first lock structure can be pivoted into a first pivot position in which the first locking feature is disposed in a rotational path of the second locking feature. Engagement of the first and second locking features inhibits rotation of the sleeve so that rotation of the output spindle will cause corresponding rotation of the chuck body relative to the sleeve.

In another form, the present teachings provide a power tool that includes a tool portion, a chuck and a locking mechanism. The tool portion has a housing, a motor disposed in the housing, and an output spindle driven by the motor. The chuck has a chuck body, which is coupled to the output spindle for rotation therewith, and a sleeve that is disposed about and rotatable relative to the chuck body. The locking mechanism has a first lock structure and a second lock structure. The first lock structure is pivotally coupled to the housing about a pivot axis for movement between a first pivot position, a second pivot position and a neutral position between the first and second pivot positions. The first lock structure has a set of first locking features. The first locking features are spaced apart along a tilt axis. The second lock structure has a set of second locking features and is coupled to the sleeve for rotation therewith. Positioning the first lock structure into the first pivot position positions a first one of the first locking features in a rotational path of the set of second locking features and spaces a second one of the first locking features away from the chuck so as to be out of the rotational path of the set of second locking features. Positioning of the first lock structure into the second pivot position positions the second one of the first locking features in the rotational path of the set of second locking features and spaces the first one of the first locking features away from the chuck so as to be out of the rotational path of the set of second locking features. Positioning of the first lock structure into the neutral position maintains the set of first locking features out of the rotational path of the second locking features.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
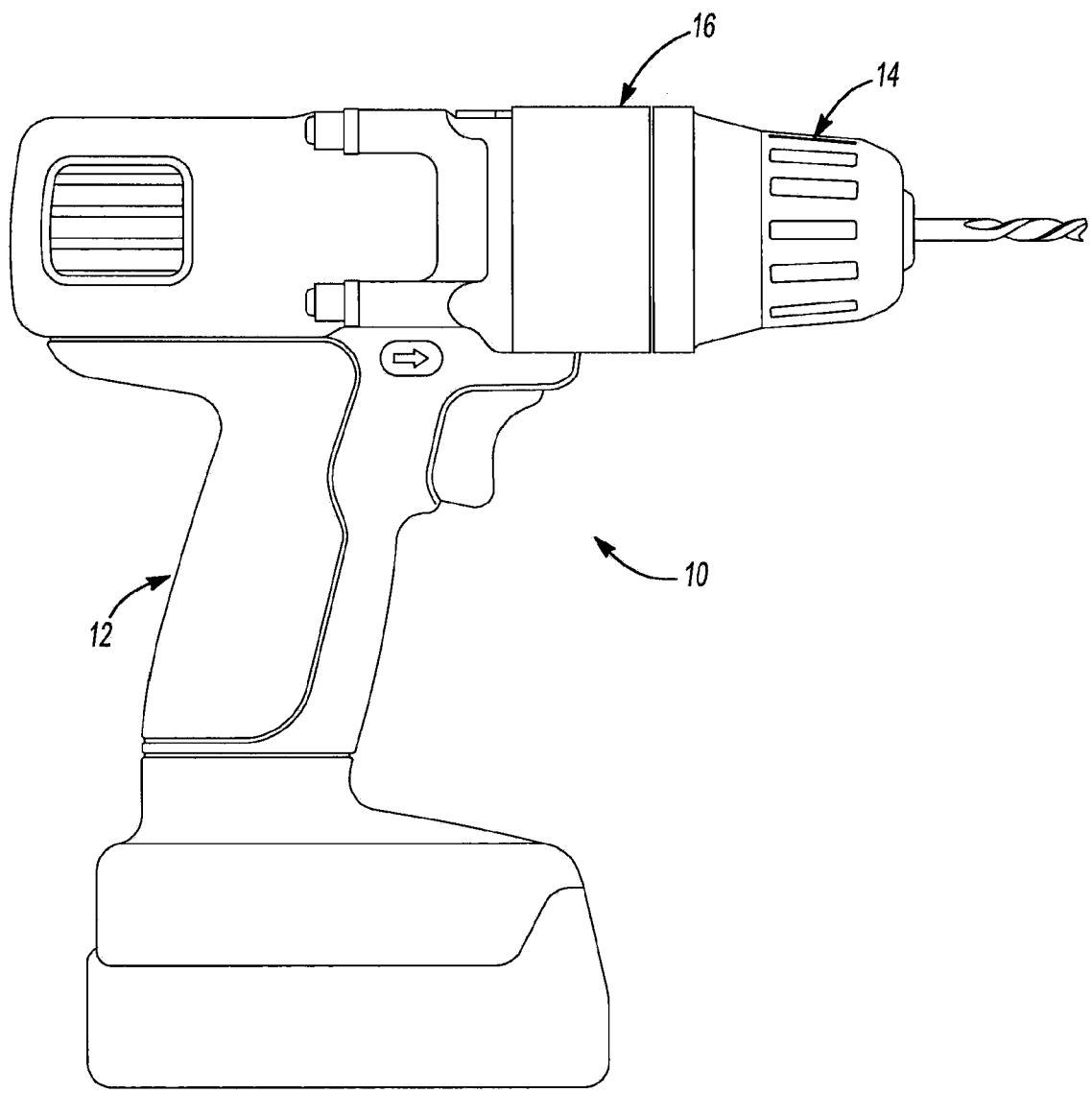
FIG. 1 is a side elevation view of an exemplary power tool constructed in accordance with the teachings of the present disclosure.
Figure 5:
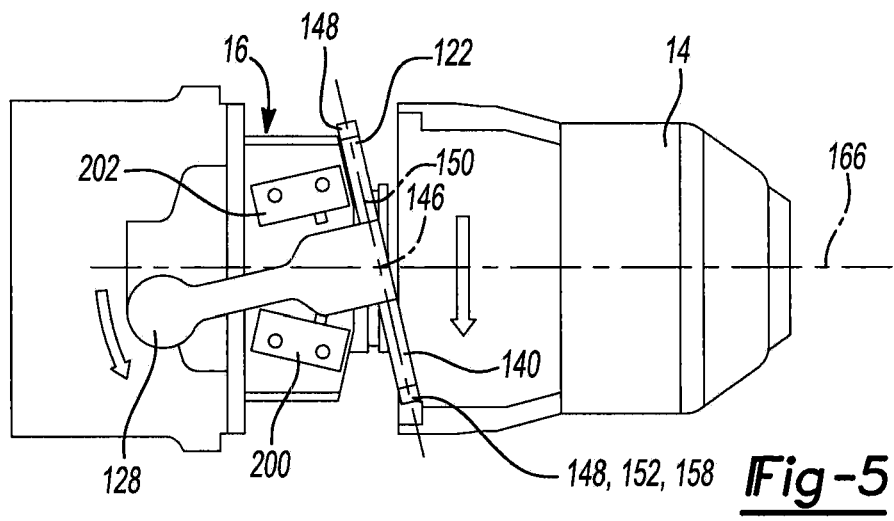
Figure 6:
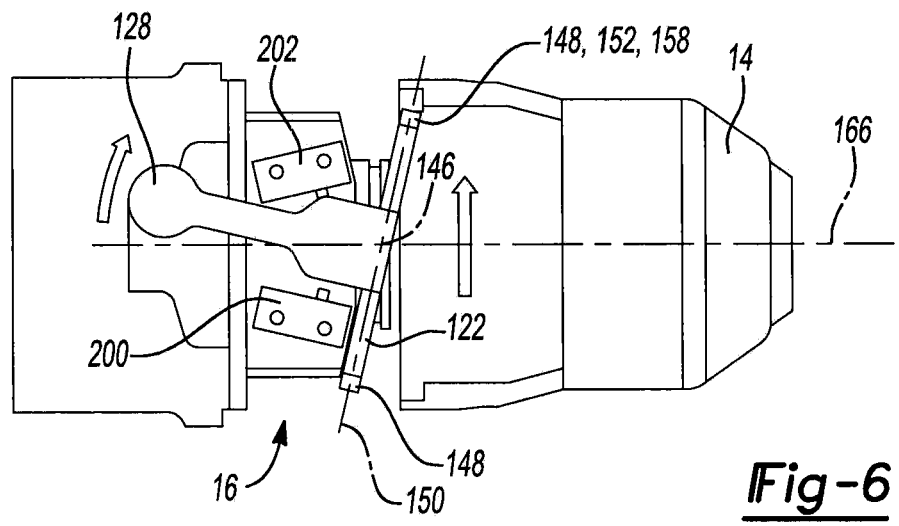
Figure 7:
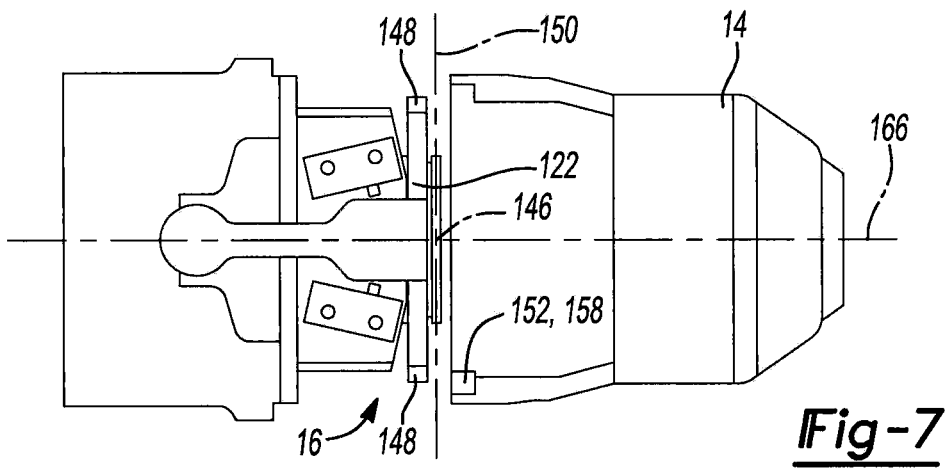
Figure 8:
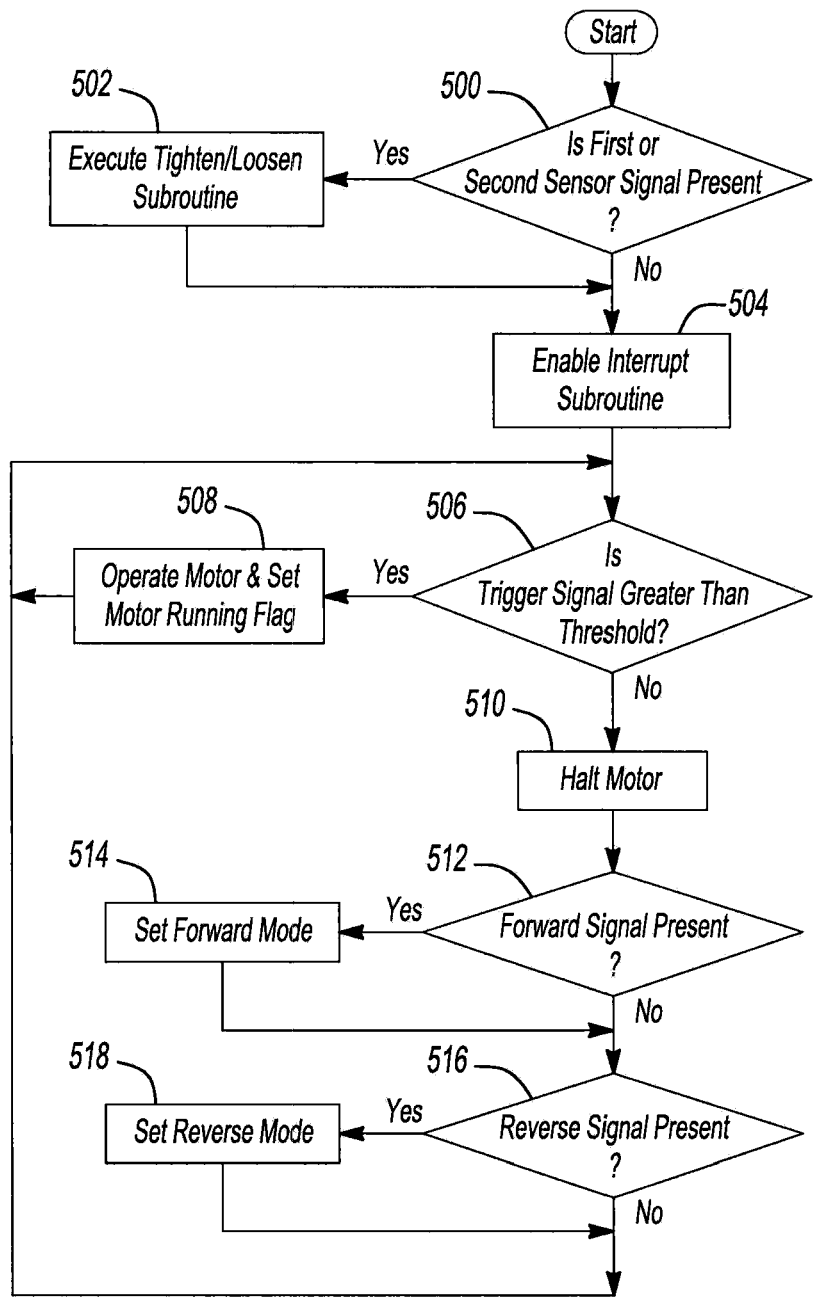
Figure 9:
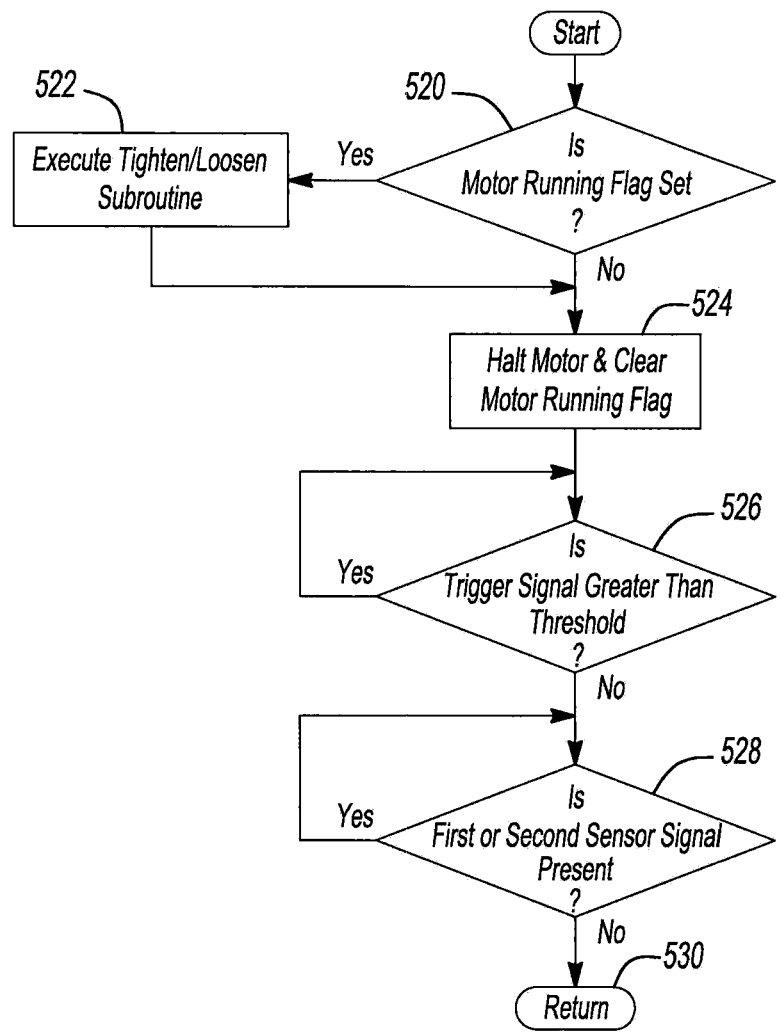
Figure 10:
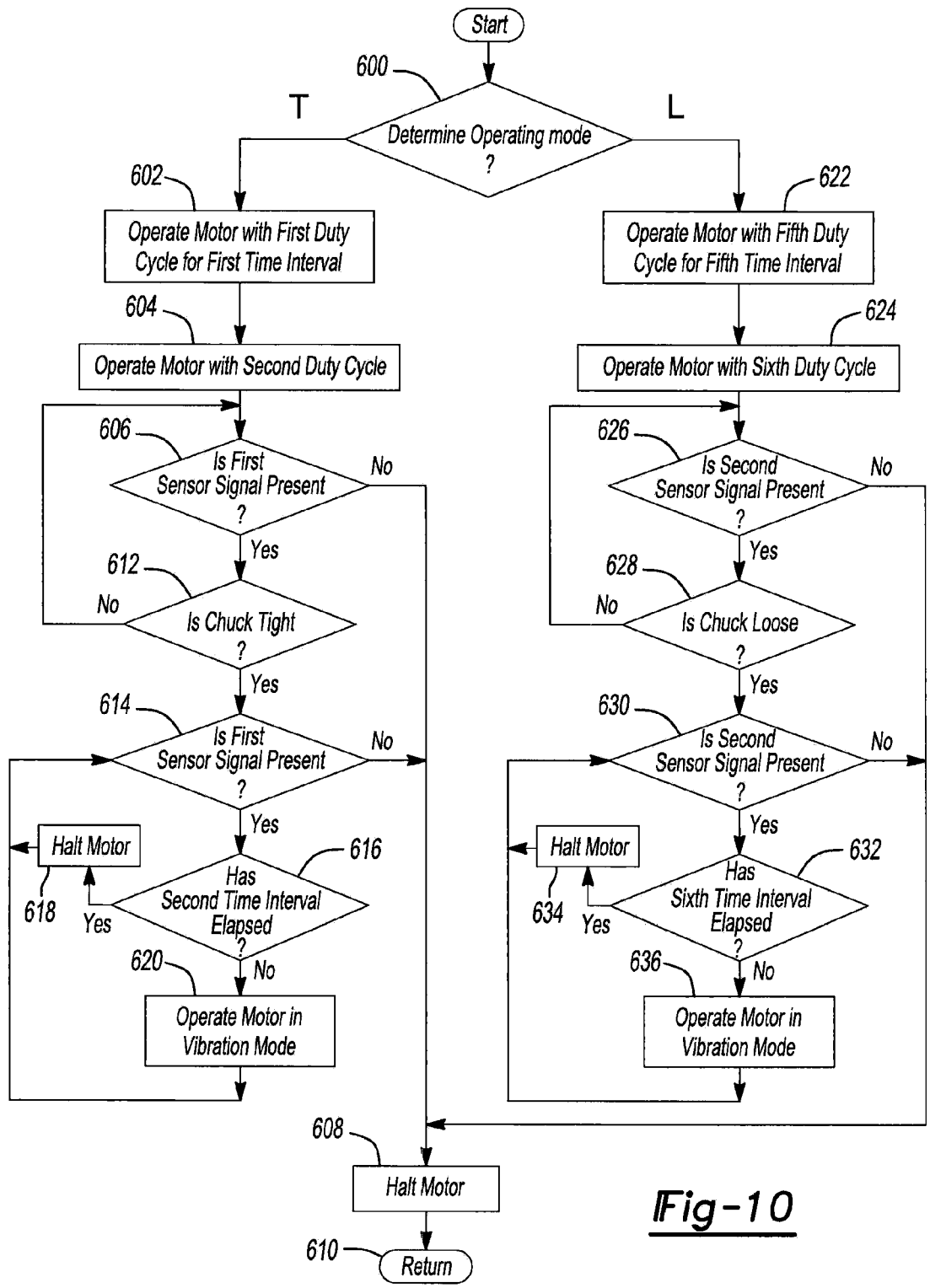

FIGS. 5, 6 and 7 are top plan views of a portion of the power tool of FIG. 1 illustrating a first lock structure of the locking mechanism in a first pivot position, a second pivot position and a neutral position, respectively; and FIGS. 8, 9 and 10 are schematic illustrations in flow-chart form of a method in accordance with the teachings of the present disclosure for controlling operation of the power tool of FIG. 1.

Corresponding reference numerals indicate corresponding parts throughout the several views of the drawings.

DETAILED DESCRIPTION

Figure 2:
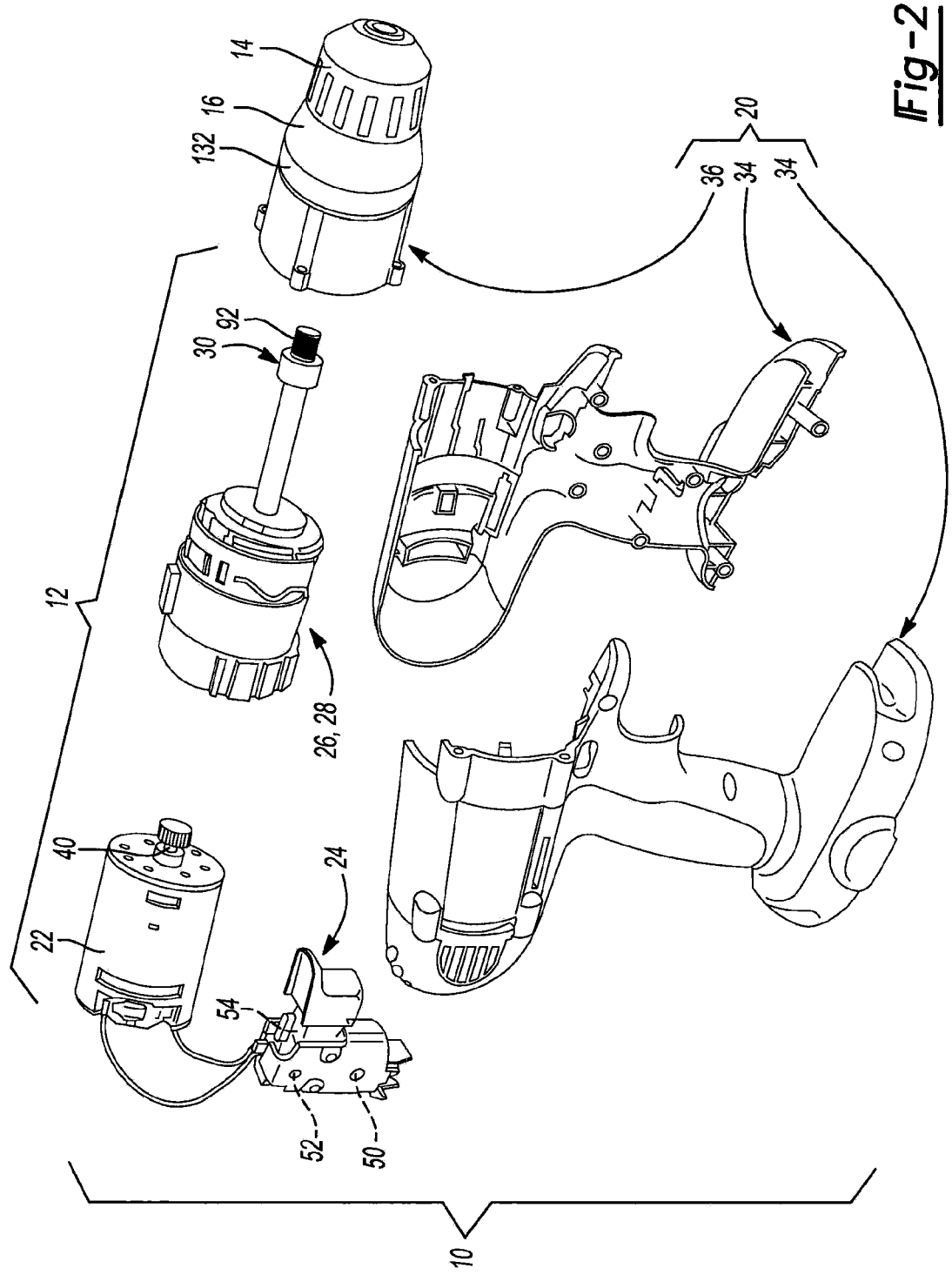
FIG. 2 is an exploded perspective view of the power tool of FIG. 1.

With reference to FIGS. 1 and 2, a power tool constructed in accordance with the teachings of the present disclosure is generally indicated by reference numeral 10. The power tool 10 can comprise a tool portion 12, a chuck 14 and a locking mechanism 16.

The tool portion 12 can be any type of tool having a rotary output that is suited to drive the chuck 14, such as a hammer/drill driver, a rotary impact/driver or a hammer/rotary impact/driver. In the particular example provided, the tool portion 12 is a drill/driver. Exemplary drill/drivers are disclosed in U.S. Pat. No. 6,431,289 and U.S. Patent Application Publication No. 2010/0163261, the disclosures of which are incorporated by reference as if fully set forth in detail herein. Briefly, the tool portion 12 can comprise a housing 20, a motor 22, a trigger assembly 24, a transmission 26, a clutch assembly 28, and an output spindle 30.

The housing 20 can be formed of two or more components that can cooperate to define an internal cavity into which the motor 22, the trigger assembly 24, the transmission 26 and the clutch assembly 28 can be housed. In the example provided, the housing 20 comprises a pair of mating handle shells 34 and a gear case 36 that is mounted to the front of the handle shells 34.

The motor 22 can comprise an output member 40 that can input rotary power to the transmission 26. The motor 22 can be any type of electric or fluid-powered motor, but in the example provided, is a brushed DC electric motor. The trigger assembly 24 can couple the motor 22 to a source of electrical power, such as a battery pack (not shown). The trigger assembly 24 can comprise a trigger controller 50, a trigger switch 52 and a trigger direction switch 54. The trigger controller 50 can conventionally direct power from the source of electrical power to the motor 22 in response to signals received from the trigger switch 52 and the trigger direction switch 54.

The transmission 26 can be any type of transmission that can be employed to provide a speed reduction and torque multiplication function. In the particular example provided, the transmission 26 is a three-stage, three-speed transmission. It will be appreciated, however, that the transmission 26 may include more or fewer stages, and may be configured to provide more or fewer speed ratios. The clutch assembly 28 can be configured to limit rotary power that is transmitted between the transmission 26 and the output spindle 30. In the particular example provided, the output spindle 30 is coupled to an output member of the transmission 26 (i.e., a planet carrier in the final or output stage) for rotation therewith and the clutch assembly 28 is configured to limit rotary power transmitted through the transmission 26 to the output member. It will be appreciated that the clutch assembly 28 could be disposed between the output member of the transmission 26 and the output spindle 30 in the alternative.

Figure 3:
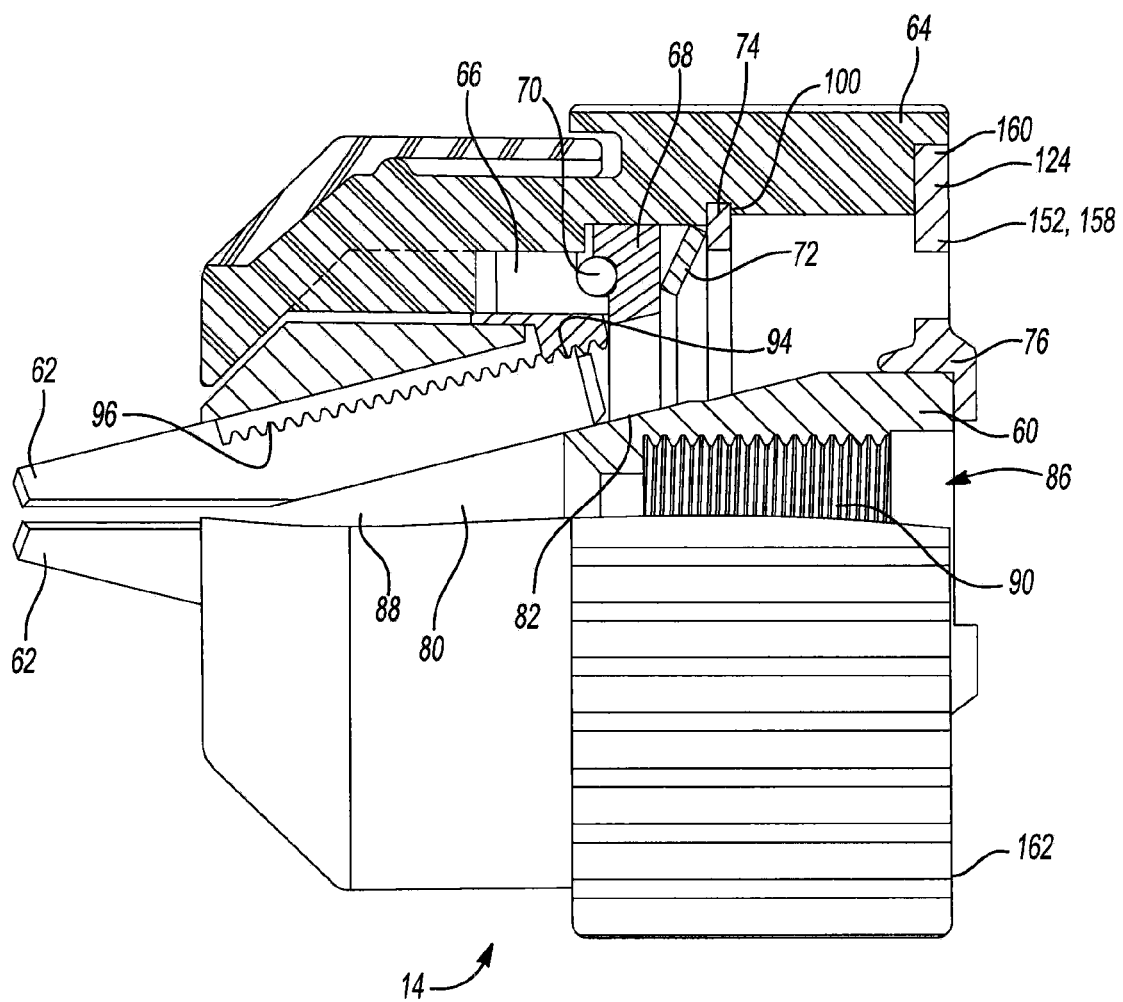
FIG. 3 is a longitudinal section view of a portion of the power tool of FIG. 1 illustrating the chuck in more detail.

With reference to FIGS. 2 and 3, the chuck 14 can be any type of keyed or key-less chuck that is suited for use with the tool portion 12. In the particular example provided, the chuck 14 is a keyless chuck and except as described herein can be somewhat similar to the chuck that is disclosed in U.S. Pat. No. 5,253,879, the disclosure of which is incorporated by reference as if fully set forth in detail herein. Briefly, the chuck 14 can comprise a chuck body 60, a plurality of jaws 62, an outer sleeve 64, a split-nut 66, a thrust ring 68, a plurality of bearing elements 70, a spring 72, a retaining ring 74 and a back plate 76.

The chuck body 60 can be a generally cylindrical structure having a central cavity 80 and a plurality of jaw apertures 82 that are configured to receive the jaws 62. The central cavity 80 can include a first cavity portion 86 and a second cavity portion 88. The first cavity portion 86 can include a female threaded portion 90 that can be sized to threadably engage mating threads 92 formed on the output spindle 30 of the tool portion 12 such that the chuck body 60 and the output spindle 30 are coupled to one another for common rotation. The second cavity portion 88 can be configured to receive a bit (not shown) between the jaws 62. The outer sleeve 64 is rotatably received over the chuck body 60. The split-nut 66 has a plurality of threads 94 that are threadably engaged to threaded surfaces 96 on the jaws 62. The split-nut 66 can be coupled to the outer sleeve 64 for common rotation and in the particular example provided, the split-nut 66 is press-fit into the outer sleeve 64. The thrust ring 68 is axially slidably received into the outer sleeve 64. The bearing elements 70 can be disposed between the thrust ring 68 and the split-nut 66. In the particular example provided, the bearing elements 70 comprise bearing balls. The retaining ring 74 can be received in a ring groove 100 formed in the outer sleeve 64. The spring 72 can be employed to bias the thrust ring 68 toward the split-nut 66. In the example provided, the spring 72 comprises a Belleville spring washer that is abutted against the retaining ring 74 and the thrust ring 68. The back plate 76 can be configured to close a portion of the outer sleeve 64 that is disposed radially between the outer sleeve 64 and the chuck body 60. In the particular example provided, the back plate 76 is fixedly coupled to the chuck body 60 for rotation therewith.

Figure 4:
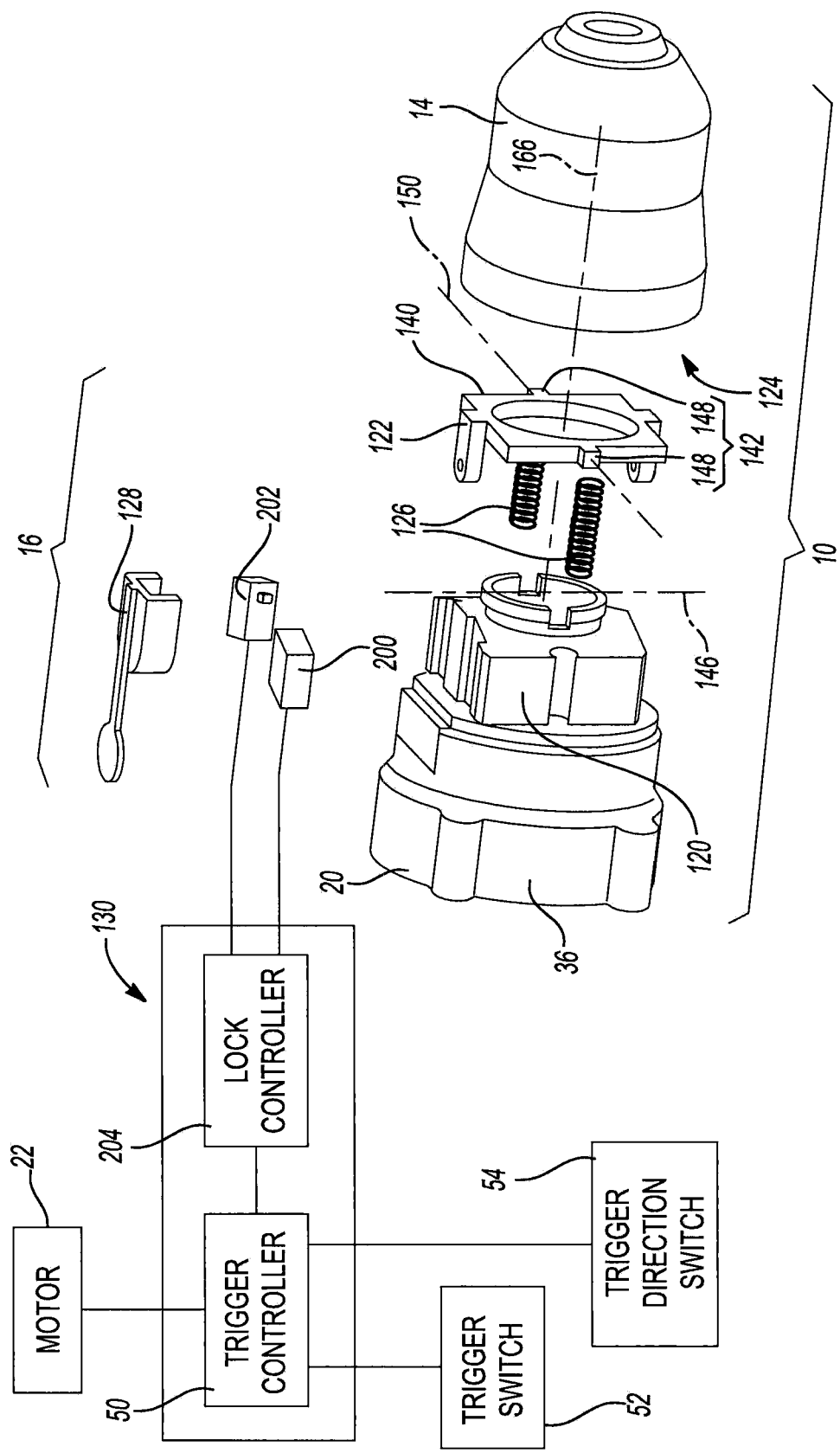
FIG. 4 is an exploded perspective view of a portion of the power tool of FIG. 1 illustrating a locking mechanism in more detail.

With reference to FIGS. 2 and 4, the locking mechanism 16 can be received between the housing 20 of the tool portion 12 and the chuck 14. The locking mechanism 16 can comprise a lock base 120, a first lock structure 122, a second lock structure 124, one or more biasing springs 126, an actuating lever 128, a mechanism control system 130 and a lock housing 132.

The lock base 120 can be fixedly coupled to the gear case 36 and can be disposed about the output spindle 30. Alternatively, the lock base 120 can be unitarily formed with the gear case 36.

The first lock structure 122 can comprise a collar 140 and a set of first locking features 142. The collar 140 can be received over the output spindle 30 and can be pivotally coupled to the lock base 120 such that at least one side of the collar 140 can be selectively pivoted about a pivot axis 146 toward the chuck 14. In the particular example provided, the first lock structure 122 may be pivoted between a first pivot position (in which a first side of the collar 140 is pivoted toward the chuck 14), a second pivot position (in which a second, opposite side of the collar 140 is pivoted toward the chuck 14), and a neutral position (in which neither side of the collar 140 is pivoted toward the chuck 14). The set of first locking features 142 can comprise a pair of first locking teeth 148 that are disposed on opposite sides of the collar 140 along a tilt axis 150.

With reference to FIGS. 3 and 4, the second lock structure 124 can comprise a set of second locking features 152 and can be fixedly coupled to the outer sleeve 64 of the chuck 14. In the particular example provided, the set of second locking features 152 comprises a second locking tooth 158 that are formed in a lock plate 160 that is fixedly coupled (e.g., welded) to the rear axial end 162 of the outer sleeve 64. The second locking tooth 158 can be configured to contact one of the first locking teeth 148 when one of the sides of the collar 140 is pivoted toward the chuck 14. It will be appreciated, however, that the second locking features 152 could be integrally and unitarily formed with the outer sleeve 64, and/or that the second locking features 152 could comprise one or more tooth recesses (not shown) that are configured to receive the first locking teeth 148 when one of the sides of the collar 140 is pivoted toward the chuck 14.

The one or more biasing springs 126 can be configured to bias the first lock structure 122 into the neutral position where the collar 140 is disposed concentrically about the output spindle 30 and the tilt axis 150 is perpendicular to the rotational axis 166 of the output spindle 30. In the particular example provided, the one or more biasing springs 126 comprises a pair of compression springs that are received between the lock base 120 and the collar 140 and each of the compression springs is configured to apply a force to the collar 140 at a point along the tilt axis 150.

The actuating lever 128 can be pivotally mounted to the lock base 120 and can be employed to pivot the first lock structure 122 about the pivot axis 146. In the particular example provided, the actuating lever 128 is movable between a first actuating position, an intermediate position, and a second actuating position.

With reference to FIG. 5, when the actuating lever 128 is in the first actuating position, the first lock structure 122 is pivoted about the pivot axis 146 such that the first locking tooth 148 on the first side of the collar 140 is positioned in the rotational path of the second locking features 152. Because pivoting the first lock structure 122 about the pivot axis 146 into the first actuating position rotates the tilt axis 150 about the pivot axis 146 such that the tilt axis 150 is not perpendicular to the rotational axis 166 of the output spindle 30 (FIG. 2), and because the first locking teeth 148 are disposed along the tilt axis 150, it will be appreciated that the first locking tooth 148 on the second side of the collar 140 will move away from the chuck 14 as the first locking tooth 148 on the first side of the collar 140 moves toward the chuck 14. Accordingly, the locking mechanism 16 is configured such that only one of the first locking teeth 148 will contact the second locking tooth 158 when the actuating lever 128 is positioned in the first actuating position.

With reference to FIG. 6, when the actuating lever 128 is in the second actuating position, the first lock structure 122 is pivoted about the pivot axis 146 such that the first locking tooth 148 on the second side of the collar 140 is positioned in the rotational path of the second locking features 152. Because pivoting the first lock structure 122 about the pivot axis 146 into the first actuating position rotates the tilt axis 150 about the pivot axis 146 such that the tilt axis 150 is not perpendicular to the rotational axis 166 of the output spindle 30 (FIG. 2), and because the first locking teeth 148 are disposed along the tilt axis 150, it will be appreciated that the first locking tooth 148 on the first side of the collar 140 will move away from the chuck 14 as the first locking tooth 148 on the second side of the collar 140 moves toward the chuck 14. Accordingly, the locking mechanism 16 is configured such that only one of the first locking teeth 148 will contact the second locking tooth 158 when the actuating lever 128 is positioned in the second actuating position.

With reference to FIG. 7, when the actuating lever 128 is positioned in the intermediate position, the first lock structure 122 is positioned such that none of the first locking teeth 148 are positioned in the rotational path of the second locking tooth 158.

Returning to FIG. 4, the mechanism control system 130 can comprise one or more sensors, such as a first sensor 200 and a second sensor 202, and a lock controller 204. The one or more sensors can be employed to generate a signal that is indicative of whether the chuck 14 is to be loosened or tightened. For example, the first and second sensors 200 and 202 are switches (e.g., limit switches) that can be actuated manually (e.g., directly by the user of the power tool 10) or via contact with another element of the locking mechanism 16, such as the first lock structure 122 or the actuating lever 128. In the example provided: the first sensor 200 generates a first sensor signal in response to contact between the actuating lever 128 and the first sensor 200 when the actuating lever 128 is in the first actuating position; and the second sensor 202 generates a second sensor signal in response to contact between the actuating lever 128 and the second sensor 202 when the actuating lever 128 is in the second actuating position. The actuating lever 128 need not contact the second sensor 202 when the actuating lever 128 is in the first actuating position or the intermediate position, and the actuating lever 128 need not contact the first sensor 200 when the actuating lever 128 is in the second actuating position or the intermediate position.

The lock controller 204 can be configured to receive the first and second sensor signals and to responsively control the operation of the motor 22 (either directly, or through the trigger controller 50). For example, the lock controller 204 could be configured to transmit a control signal to the trigger controller 50 to cause the trigger controller 50 to control the operation of the motor 22 according to one or more predetermined control schemes. A control scheme may include, for example, a rotational direction of the motor 22, a rotational speed of the motor 22, and/or additional control parameters, such as a maximum time of operation of the motor 22. It will be appreciated that the control scheme for controlling the motor 22 when loosening the chuck 14 may be different from the control scheme for controlling the motor 22 when tightening the chuck 14. For example, the control scheme for operating the motor 22 to loosen the chuck 14 may be configured to cause the motor 22 to develop a relatively higher amount of torque than the control scheme for operating the motor 22 to tighten the chuck 14 due to differences between static and dynamic friction. It will also be appreciated that input from the trigger switch 52 and the trigger direction switch 54 may be ignored (by the trigger controller 50 and/or the lock controller 204) when controlling the motor 22 according to a control scheme for loosening or tightening the chuck 14.

More sophisticated algorithms for tightening the chuck 14 may include for example an additional control parameter that detects a sharp rise in the current level provided to the motor 22 as the motor 22 is rotated clockwise (the sharp rise may be indicative of contact between the jaws 62 of the chuck 14 and a tool bit (not shown) received between the jaws 62). If desired, the additional control parameters may further include the provision of a short pulse of higher voltage power (e.g., through the use of a higher duty cycle in a pulse-width modulated power supply in the trigger controller 50) after the detection of the sharp rise in the current level provided to the motor 22 to cause the motor 22 to provide an increased amount of torque (to tighten the chuck 14 to a desired extent), after which power to the motor 22 can be interrupted.

More sophisticated algorithms for loosening the chuck 14 may include for example the detection of a sharp rise in the current level provided to the motor 22 as the motor 22 is rotated counterclockwise (the sharp rise in current may be indicative of the engagement of the first and second locking features 142 and 152), and thereafter providing a short pulse of higher voltage power (e.g., through the use of a higher duty cycle in a pulse-width modulated power supply in the trigger controller 50) to cause the motor 22 to provide an increased amount of torque (to release the jaws 62 from the bit (not shown) in the chuck 14). Another set of additional parameters may be employed to detect a second sharp rise in the current provided to the motor 22 as the motor 22 is rotated counterclockwise (which could be indicative of the movement of the jaws 62 into a fully opened position) and to thereafter interrupt the supply of power to the motor 22.

With reference to FIGS. 4 and 8, a method for controlling the motor 22 that coordinates control of the motor 22 responsive to the trigger switch 52, the trigger direction switch 54 and the first and second sensors 200 and 202 will be described in detail. Control can progress to decision block 500, where control can determine whether the first sensor signal (from the first sensor 200) or the second sensor signal (from the second sensor 202) is being generated. If the first sensor signal or the second sensor signal is being generated, control can proceed to block 502 to execute a tighten/loosen subroutine (discussed in more detail below). If neither of the first and second sensor signals is present in decision block 500, control can proceed to block 504 to enable an interrupt subroutine so that the interrupt subroutine can operate concurrently with the control of FIG. 8. Control can proceed to decision block 506 where a value of a trigger signal generated by the trigger switch 52 is compared with a predetermined threshold. If the value of the trigger signal is greater than the predetermined threshold, control can proceed to block 508 where a duty cycle for the supply of electrical power via a pulse-width modulation in accordance with the trigger signal is employed to provide electrical power to the motor 22 (to operate the motor 22) and a motor running flag is set. Control can loop back to decision block 506. Returning to decision block 506, if the value of the trigger signal is not greater than the predetermined threshold, control can proceed to block 510 where control halts operation of the motor 22 (e.g., by interrupting the supply of electrical power to the motor 22). Control can proceed to decision block 512 where control determines if a trigger direction signal generated by the trigger direction switch 54 is indicative of a forward switch setting. If the trigger direction signal is indicative of the forward switch setting, control can proceed to block 514 where control sets a forward mode. Control can then proceed to decision block 516. Returning to decision block 512, if the trigger direction signal is not indicative of the forward switch setting, control can proceed to decision block 516, where control determines if the trigger direction signal generated by the trigger direction switch 54 is indicative of a reverse switch setting. If the trigger direction signal is indicative of the reverse switch setting, control can proceed to block 518 where control sets a reverse mode. Control can them loop back to decision block 506. Returning to decision block 516, if the trigger direction signal is not indicative of the reverse switch setting, control can loop back to decision block 506.

In FIG. 9, the interrupt subroutine is illustrated. With reference to FIGS. 4 and 9, control can proceed to block 520 where control determines if the motor flag has been set (i.e., if the motor 22 is operating). If the motor flag has not been set, control proceeds to block 522 to execute the tighten/loosen subroutine (discussed in more detail below). If the motor flag has been set in decision block 520, control proceeds to block 524, where control halts the operation of the motor 22 and clears the motor running flag. Control proceeds to decision block 526, where control compares the value of a trigger signal generated by the trigger switch 52 with a predetermined threshold. If the value of the trigger signal is greater than the predetermined threshold, control can loop back to decision block 526. If the value of the trigger signal is not greater than the predetermined threshold, control can proceed to decision block 528 where control determines if the first sensor signal or the second sensor signal is present. If the first sensor signal or the second sensor signal is present, control can loop back to decision block 528. If neither the first sensor signal nor the second sensor signal is present in decision block 528, control can proceed to block 530 where the interrupt subroutine can terminate.

In FIG. 10, the tighten/loosen subroutine is illustrated. With reference to FIGS. 4 and 10, control can proceed to decision block 600 where control determines an operational mode for operating the power tool 10 (FIG. 1) based on the first and second sensor signals. If the first sensor signal is present and the second sensor signal is not present, the operational mode of the power tool 10 (FIG. 1) can be a tightening mode and control can proceed to block 602 where a first duty cycle (e.g., 40%) for the supply of electrical power via a pulse-width modulation is employed to provide electrical power to the motor 22 (to operate the motor 22) for a first time interval (e.g., 100 ms). When the first time interval elapses, control can proceed to block 604, where a second duty cycle (e.g., 20%) can be employed to provide electrical power to the motor 22 (to operate the motor 22). The second duty cycle can be selected to operate the motor 22 at a relatively lower speed. Control can proceed to decision block 606, where control determines if the first sensor signal is present. If the first sensor signal is not present, control can proceed to block 608 where the motor 22 is halted (e.g., by interrupting electric power to the motor 22). Control can proceed to block 610, where the tighten/loosen subroutine is terminated. Returning to decision block 606, if control determines that the first sensor signal is present, control can proceed to decision block 612 where control can determine if the chuck 14 is tight. Various techniques can be employed to determine if the chuck 14 is tight. For example, control can determine if the current (i) associated with the electric power that is supplied to the motor 22 exceeds a predetermined current threshold (Ti) or if a change in the current over time (di/dt) exceeds a predetermined rate (Ri). If the chuck 14 is not tight, control can loop back to decision block 606. If control determines that the chuck 14 is tight in decision block 612, control can proceed to decision block 614 where control determines if the first sensor signal is present. If the first sensor signal is not present, control can proceed to block 608. If the first sensor signal is present in decision block 614, control can proceed to decision block 616, where control can determine if a second time interval has elapsed. The second time interval can start to run when tighten/loosen subroutine initiates operation of the motor in the vibration mode in block 620 (discussed in more detail below). If the second time interval has elapsed, control can proceed to block 618, where operation of the motor is halted. Control can loop back to decision block 614. Returning to decision block 616, if the second time interval has not elapsed, control can proceed to block 620, where the motor 22 can be operated in a vibration mode. In the particular example provided, the vibration mode comprises alternating power input to the motor 22 between a forward direction at a third duty cycle (e.g., 20%) for a third time interval (e.g., 15 ms) and a reverse direction at a fourth duty cycle (e.g., 20%) for a fourth time interval (e.g., 15 ms). Control can loop back to decision block 614. It will be appreciated that the vibration mode is intended to provide feedback to the operator of the power tool 10 that indicates that the chuck 14 is tight. It will be appreciated that other forms of alerts or alarms, including lights and/or sounds, could be used in addition to or in lieu of the vibration mode.

Returning to decision block 600, If the first sensor signal is not present and the second sensor signal is present, the operational mode of the power tool 10 (FIG. 1) can be a loosening mode and control can proceed to block 622 where a fifth duty cycle (e.g., 55%) for the supply of electrical power via a pulse-width modulation is employed to provide electrical power to the motor 22 (to operate the motor 22) for a fifth time interval (e.g., 100 ms). When the fifth time interval elapses, control can proceed to block 624, where a sixth duty cycle (e.g., 20%) can be employed to provide electrical power to the motor 22 (to operate the motor 22). The sixth duty cycle can be selected to operate the motor 22 at a relatively lower speed. Control can proceed to decision block 626, where control determines if the second sensor signal is present. If the second sensor signal is not present, control can proceed to block 608 where operation of the motor 22 is halted. Returning to decision block 626, if control determines that the second sensor signal is present, control can proceed to decision block 628 where control can determine if the chuck 14 is loose. Various techniques can be employed to determine if the chuck 14 is loose. For example, control can determine if the current (i)

associated with the electric power that is supplied to the motor 22 exceeds a predetermined current threshold (T2i) or if a change in the current over time (di/dt) exceeds a predetermined rate (R2i). If the chuck 14 is not loose, control can loop back to decision block 626. If control determines that the chuck 14 is loose in decision block 628, control can proceed to decision block 630, where control determines if the second sensor signal is present. If the second sensor signal is not present, control can proceed to block 608 where operation of the motor 22 is halted. Returning to decision block 630, if control determines that the second sensor signal is present, control can proceed to decision block 632 where control can determine if a sixth time interval has elapsed. The sixth time interval can start to run when tighten/loosen subroutine initiates operation of the motor in the vibration mode in block 636 (discussed in more detail below). If the sixth time interval has elapsed, control can proceed to block 634, where operation of the motor is halted. Control can loop back to decision block 630. Returning to decision block 632, if the sixth time interval has not elapsed, control can proceed to block 636 where the motor 22 can be operated in the vibration mode. In the particular example provided, the vibration mode comprises alternating power input to the motor 22 between the forward direction at the third duty cycle (e.g., 20%) for the third time interval (e.g., 15 ms) and the reverse direction at the fourth duty cycle (e.g., 20%) for the fourth time interval (e.g., 15 ms). Control can loop back to decision block 630. It will be appreciated that the vibration mode is intended to provide feedback to the operator of the power tool 10 that indicates that the chuck 14 is loose. It will be appreciated that other forms of alerts or alarms, including lights and/or sounds, could be used in addition to or in lieu of the vibration mode While the lock controller 204 has been described as being separate and discrete from the trigger controller 50 for purposes of this discussion, those of skill in the art will appreciate that the lock controller 204 and the trigger controller 50 could be a single controller.

With reference to FIGS. 2 and 4, the lock housing 132 can be configured to shroud the lock base 120, the first lock structure 122, the second lock structure 124, the one or more biasing springs 126 and some or all of the mechanism control system 130. The lock housing 132 can be an annular structure that can be fixedly coupled to the gear case 36.

While the locking mechanism 16 has been illustrated and described as being permanently mounted to the tool portion 12, it will be appreciated that the locking mechanism 16 may be utilized in a system of tools having removable heads. Such removable tool head systems are disclosed in U.S. Pat. Nos. 7,021,399; 6,634,439; and 6,675,911. Additionally, the removable tool head may comprise electrical contacts that permit the removable tool head to communicate with the trigger controller to control the motor in an appropriate manner.

It will also be appreciated that while the locking mechanism 16 has been illustrated and described as having a pivoting actuating lever 128 that is directly actuatable by the user of the power tool 10, the actuating lever 128 could be manipulated in the alternative via a collar (not shown) that is pivotally mounted to the tool portion 12. Pivoting or partially rotating the collar in a first rotational direction can cause pivoting of the actuating lever 128 in a first direction, while pivoting or partially rotating the collar in a second, opposite rotational direction can cause pivoting of the actuating lever 128 is a second opposite direction. One or more springs associated with the collar or the actuating lever 128 could be employed to return the collar to a neutral position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power tool comprising:
a tool portion having a housing, a motor disposed in the housing, and an output spindle driven by the motor;
a chuck having a chuck body, which is coupled to the output spindle for rotation therewith, and a sleeve that is disposed about and rotatable relative to the chuck body; and
a locking mechanism having a first lock structure and a second lock structure, the first lock structure being movably coupled to the housing and having a first set of locking features, the second lock structure being coupled to the sleeve for rotation therewith, wherein the first lock structure can be moved into a first position in which a first one of the first locking features is disposed in a rotational path of the second lock structure and a second one of the first set of locking features is out of the rotational path of the lock structure;
wherein the first lock structure can be moved into a second position in which a second one of the first locking features is disposed in a rotational path of the second lock structure and a first one of the first set of locking features is out of the rotational path of the second lock structure; and
wherein the first lock structure can be moved into a neutral position in which maintains the set of first locking features out of the rotational path of the second lock structure.

2. The power tool of claim 1, wherein the chuck further comprises a plurality of jaws that are received in corresponding holes formed in the chuck body.

3. The power tool of claim 1, wherein the first set of locking features comprises a locking tooth.

4. The power tool of claim 1, wherein the locking mechanism further comprises an actuator for pivoting the first lock structure.

5. The power tool of claim 4, further comprising at least one sensor for sensing a position of the actuator or the first lock structure when the first lock structure is positioned in the first position.

6. The power tool of claim 1, further comprising a controller for controlling operation of the motor when the first lock structure is positioned in the first position.

7. The power tool of claim 6, further comprising at least one sensor for generating a first sensor signal in response to positioning of the first lock structure in the first position, the controller receiving the first sensor signal and responsively controlling the motor according to a first control scheme.

8. The power tool of claim 7, wherein the first control scheme includes a motor rotational direction and a parameter that is indicative of a maximum motor torque.

9. The power tool of claim 8, wherein the first control scheme is configured to change operation of the motor in response to a predetermined rise in current to the motor.

10. The power tool of claim 9, wherein the controller halts operation of the motor in response to the predetermined rise in current to the motor.

11. A power tool comprising:
- a tool portion having a housing, a motor disposed in the housing, and an output spindle driven by the motor;
- a chuck having a chuck body, which is coupled to the output spindle for rotation therewith, and a sleeve that is disposed about and rotatable relative to the chuck body; and
- a locking mechanism having a first lock structure and a second lock structure, the first lock structure being pivotally coupled to the housing about a pivot axis for movement between a first pivot position, a second pivot position and a neutral position between the first and second pivot positions, the first lock structure having a set of first locking features, the first locking features being spaced apart along a tilt axis, the second lock structure having a set of second locking features and being coupled to the sleeve for rotation therewith, wherein positioning the first lock structure into the first pivot position positions a first one of the first locking features in a rotational path of the set of second locking features and spaces a second one of the first locking features away from the chuck so as to be out of the rotational path of the set of second locking features, wherein positioning of the first lock structure into the second pivot position positions the second one of the first locking features in the rotational path of the set of second locking features and spaces the first one of the first locking features away from the chuck so as to be out of the rotational path of the set of second locking features, and wherein positioning of the first lock structure into the neutral position maintains the set of first locking features out of the rotational path of the second locking features.

12. The power tool of claim 11, further comprising a control system having a controller that operates the motor when the first lock structure is positioned in the first pivot position and when the first lock structure is positioned in the second pivot position.

13. The power tool of claim 12, wherein the control system comprises at least one sensor for generating at least one sensor signal that is indicative of a position of the first lock structure.

14. The power tool of claim 13, wherein the controller operates the motor according to a first control scheme when the first lock structure is in the first pivot position and wherein the controller operates the motor according to a second control scheme that is different from the first control scheme when the first lock structure is in the second pivot position.

15. A power tool comprising:
- a tool portion having a housing, a motor disposed in the housing, and an output spindle driven by the motor;
- a chuck having a chuck body, which is coupled to the output spindle for rotation therewith, and a sleeve that is disposed about and rotatable relative to the chuck body;
- the chuck further including jaws which may be moved in a direction of opening the jaws or a direction of closing the jaws;
- a user operable trigger switch for operating the motor to drive the chuck body and the sleeve together; and
- a user operable actuating member for opening and closing the jaws;
- at least one controller;
- wherein, when the actuating member is actuated, the sleeve is locked to prevent relative rotation of the sleeve with respect to the tool body and the motor is driven;
- when the actuating member is actuated to open the jaws, the at least one controller controls the motor to develop a first torque and when the actuating member is actuated to close the jaws, the at least one controller controls the motor to develop a second torque, different than the first torque; and
- wherein the actuating mechanism comprises a single user actuatable actuator which is actuatable to a first position to open the jaws and a second position to close the jaws.

16. The power tool of claim 15, wherein the first torque is greater than the second torque.

* * * * *